United States Patent [19]

Knutsen et al.

[11] 3,852,260

[45] Dec. 3, 1974

[54] PROCESS FOR PREPARING FISH PROTEIN USING PROPANOL OR BUTANOL

[75] Inventors: Tryggve Lund Knutsen, Motellvagen; Sven-Olof Österman, Havrekornsgatan, both of Sweden

[73] Assignee: Astra Nutrition Aktiebolag, Molndal, Sweden

[22] Filed: Feb. 2, 1973

[21] Appl. No.: 329,205

[30] Foreign Application Priority Data

Feb. 4, 1972  Great Britain...................... 5419/72

[52] U.S. Cl. ............................ 260/112 R, 426/364
[51] Int. Cl. .............................................. A23j 1/04
[58] Field of Search ................................. 260/112 R

[56] References Cited
UNITED STATES PATENTS

| | | | |
|---|---|---|---|
| 2,972,542 | 2/1961 | Levin............................. | 260/112 X |
| 3,252,962 | 5/1966 | Whaley et al................... | 260/112 R |
| 3,707,381 | 12/1972 | Sharp........................... | 260/112 R X |

Primary Examiner—Howard E. Schain
Attorney, Agent, or Firm—Brumbaugh, Graves, Donohue & Raymond

[57] ABSTRACT

A process for preparing a substantially fat-free, tasteless and odorless protein from fresh fish wherein the fish material after a pretreatment is subjected to extraction for removing fat and taste-producing and odor-producing substances with one or more solvents selected from the group consisting of solvents which can remove or substantially remove fat and taste- and odor-producing substances from fish material, characterized in that the fish in fresh condition after disintegration, boiling, deboning, separation, pressing and partial dewatering to a remaining water content of 12–20 percent by weight whereby bones, stick water and certain fats are removed, is mixed with the same kind of solvent which will be used in the subsequent aforementioned extraction process, and in an amount of 10–30 percent, preferably 15–25 percent by weight calculated on the amount of water retained in the material.

5 Claims, No Drawings

PROCESS FOR PREPARING FISH PROTEIN USING PROPANOL OR BUTANOL

The present invention relates to a process for preparing a substantially fat-free, tasteless and odorless protein from fish, the fish material after a pretreatment being subject to an extraction for removing fat, and taste and odor-producing substances with one or more solvents selected from the group of solvents which can remove or substantially remove fat and taste and odor-producing substances from the fish material.

The object of the present invention is to obtain a method for preparing protein from fish during such periods when the supply of fish is limited or decreased.

Another object is thereby to manage to store the fish material for a long time without bacterial growth, autooxidation of the fat present in the fish material, and protein destruction.

There is a necessary demand in the preparation of protein for human consumption that the amount of bacteria be low, as otherwise dangerous diseased states may occur.

In order to improve the extraction further, with regard to the removal of fat, there is also a requirement for inhibiting the autooxidation of the fat in the material, as such an oxidation complicates the extraction to a great extent.

There is further a requirement that any destruction of the protein does not take place from enzymatic activity, as the nutritional value of the protein then is markedly reduced.

It is previously known to preserve whole, ground red hake in 91 percent isopropanol for a period of up to 11 days at room temperature (the United States Department of Interior, Fish & Wild Life Service, Bureau of Commercial Fisheries, Washington, D.C. June 15, 1967, Addendum to Request for Proposals for Design, Construction and Operation of a Demonstration Plant for Production of Fish Protein Concentrate — Invitation No. CF 8-40, including "Supplement to Appendix A". However, this process has the drawback that already after 11 days of preservation, 5 percent of the total protein has been destroyed by means of enzymatic activity.

It has also been proposed that one should prepare a valuable fish meal from fresh fish by boiling and pressing it. Such a fish meal may be stored for long times, but has the drawback that the fat of the material is autooxidized and that the phospholipides present in the fat give the meal a very unpleasant odor and taste. A marked decrease in nutritional value is also obtained.

It has now, however, surprisingly been found that very good results are obtained by the present invention which substantially is characterized in that the fish in a fresh state after disintegration, boiling, deboning, separation, pressing and partial dewatering to a remaining proportion of water of 12 to 20 percent by weight whereby bones, stick water and certain fats are removed, is mixed with the same kind of solvent, which is used in a following extraction step, and in an amount of 10 to 30 percent, preferably 15 to 25 percent by weight calculated on the amount of the water remaining in the material.

The present invention provides, in addition to an inhibition of bacterial growth and fat oxidation, that all enzymatic activity has ceased before storage, so that no hydrolysis of the protein takes place and the protein will retain all its nutritional value, and that the protein yield will increase.

Suitable solvents for the extraction, and thereby the preservation, are lower alkanols, having at most 4 carbon atoms, such as ethanol, isopropanol, n-butanol, sec-butanol, and isobutanol. Mixtures of these alkanols may be used as well.

The essential feature is not that the protein material per se is mixed with a solvent, but that the water present in the protein material is mixed with such an amount of a solvent that it cannot serve as a medium for bacterial growth using protein and fat as a nutritional source.

An embodiment of the invention will be described in the following. The invention is, however, not limited thereto.

Fresh, newly caught fish is boiled in a vertical boiler by means of indirect as well as direct steam while stirring. After the boiling, which takes 10 minutes at 90° to 95°C, the fish mass is pumped to a deboning station where bones, big gut fragments, eyes, gills, etc. are partially removed. By this removal of the bone fraction the ash residue of the final protein material may be decreased by 50 percent. The deboning operation takes place at a suitable temperature of 90°C.

The fish material thus boiled and freed from bones etc. is then centrifuged and pressed, so that stick water and some fat is removed. Such a material is called press cake. This is then transported to a drying station where a partial drying is carried out, whereby the amount of water is reduced from 50 percent to 12–20 percent by weight of the total material. By breaking off the drying at this amount, the beginning of the autooxidation may be retarded remarkedly.

The stick water containing fat may be separated in order to obtain water soluble protein and fat.

The partially dried fish material is then transported to a mixing vessel. In this vessel the protein material is mixed with 15 to 25 percent by weight, calculated on the weight of water present in the material, with the same kind of solvent which will be used in the extraction process. Thereafter the material is transported to a sacking station where the material is put into air and gas impervious sacks, for the storage before it enters the final extraction process, wherein all taste and odor-producing substances and substantially all the fat is removed from the material.

By the addition of the solvent a preservation is obtained so that the material may be stored in a buffer storage for a very long time. The material thus preserved is brought into an extraction process, e.g. when the supply of fresh material is low, where the material is extracted with a solvent, preferably in counter-current fashion in a number of steps. After each step of the extraction process the solvent is separated from the material by centrifugation, whereupon the material is transported to the following step and the solvent is transported to the previous step. After the last step the material is transported to a solvent removing station where the residual amount of solvent is removed, while the solvent from the first extraction step is transported to a recovery plant.

The removal of the solvent is carried out by means of direct steam counter-current to the material flow, all solvent being removed.

At the same time a deodorizing procedure takes place by means of the direct steam on the volatile taste and odor-producing substances, preferably amines.

Protein material thus freed from solvent is then brought to a drying station where the amount of water is reduced to about 5 percent by weight, whereupon the material is ground and sieved.

The material prepared contains 90 to 93 percent by weight of raw protein calculated on the dry contents, of which protein 95 to 96 percent is digestable raw protein. The total fat amounts to 0.1 to 0.2 percent by weight only, and the remaining amount of solvent is only 10 to 40 ppm.

The solvent used in the extraction was isopropanol but other solvents such as n-, sec-, and isobutanol may be used as well, as mentioned above.

The preservation of the material partially dried is carried out suitably with the same kind of solvent as will be used in the following extraction process. The solvent used in the preservation is either pure or is taken from the second step of the extraction process, where it is removed by centrifugation. The preservation ought to take place immediately, but shall take place before any bacterial growth occurs.

Besides the solvent, an antioxidant may be added to the material in order to improve the antioxidation effect.

In order to determine the effect obtained by preservation by means of isopropanol and sec-butanol, an analysis of the contents of bacteria was carried out after 40 days of storage at room temperature and two different contents of each alcohol.

In Table 1 below, the amount of alcohol is the total amount in the liquid around the material during the preservation process.

Table 1

| Isopropanol % | Sec-butanol % | Total number of bacteria per gram material after 40 days |
|---|---|---|
| 15 | | 100 |
| 30 | | 200 |
| | 15 | 300 |
| | 30 | 400 |

As is evident from Table 1 there are very few bacteria present per gram of material after storage for 40 days, using either isopropanol or sec-butanol.

In order to show the difference in autooxidation between a conventional fish meal and a fish material prepared according to the present invention, before extraction and without addition of an antioxidant, the following comparative tests were carried out, where the two materials were stored in dark at 25°C totally for 40 days. Samples were taken continuously, the amounts of peroxides and the benzidine values being determined.

The results are given in Tables 2 and 3 below, where Table 2 shows the amounts of peroxides obtained and Table 3 shows the benzidine values obtained for fish meal and partially dried and preserved material according to the invention.

The amounts of peroxides are given as mE of peroxides per kg of fat in the materials and the benzidine values are mg of aldehyde formed in the destruction of peroxides formed to aldehyde according to the reaction scheme.

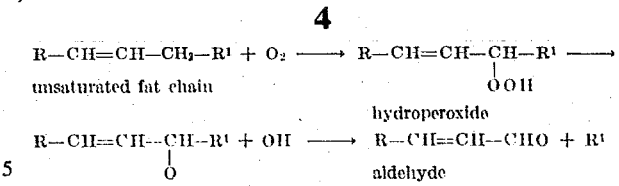

The aldehyde formed is then reacted with benzidine to oxidize this to a colored product according to the reaction scheme:

R—CH=CH—CHO+H$_2$N—(C$_6$H$_4$)$_2$—NH$_2$
R—CH=CH—CH=N—(C$_6$H$_4$)$_2$—N=HC—CH=CH—R

These tests were carried out using isopropanol as a preserving agent but the same good results are obtained using sec-butanol.

Table 2

| Days | Amount of peroxide mE/kg fat | |
|---|---|---|
| | Fish meal | Fish material according to invention |
| 0 | 20 | 20 |
| 7 | 140 | 12 |
| 9 | 172 | — |
| 10 | — | 14 |
| 16 | 75 | 8 |
| 21 | 73 | 10 |
| 35 | 28 | 3 |

Table 3

| Days | Benzidine value Relative values | |
|---|---|---|
| | Fish meal | Fish material according to invention |
| 0 | 2 | 2 |
| 7 | 15 | 2 |
| 10 | 103 | 2 |
| 16 | 63 | 10 |
| 21 | 53 | 11 |
| 35 | 45 | 11 |

As evident from Table 2 there is a very high proportion of peroxides in fish meal after 9 days, while the proportion of peroxides in the preserved material is consistently very low.

The same is true for the benzidine value, which in fish meal rises very markedly after 7 days and has reached its maximum after 10 days. In the preserved material there is a minor increase after 10 days, but the total value is 80 percent below the value for the fish meal.

The different analyses made show the fat oxidation to peroxides and further to aldehydes, where the benzidine values are out of phase relative to the peroxide values. As evident, the values decrease but it only indicates that the autooxidation continues so that products, which may not be shown by these tests, are formed.

As there are very large distances to the fishing grounds, difficulties may arise to get fresh fish ashore. Under such circumstances it is therefore suitable to have a production of a semi-finished product according to the present invention on board a ship.

As preservation takes place at the fishing grounds, the fish is in a warranted fresh condition when the process starts, whereby an extremely qualitatively pure protein product is obtained in the extraction process.

We claim:

1. In a process for preparing a substantially fat-free tasteless and odorless protein from fresh fish, wherein fish material in fresh condition is subjected to disintegration, boiling, deboning, separation, pressing and partial dewatering, whereby bones, stick water and certain fats are removed and wherein the fish material thereafter is stored in an air and gas impervious container, and thereafter the fish material is subjected to extraction for removing fat, and taste- and order-producing substances with one or more solvents selected from the group consisting of solvents which can remove or substantially remove fat and taste- and order-producing substances from fish material and which group consists of isopropanol, n-butanol, sec-butanol and isobutanol, the improvement which comprises said dewatering being to a water content 12 to 20 percent by weight, and mixing said dewatered material prior to said storage with a member of said group of solvents in an amount of 10 to 30 percent by weight of such solvent calculated on the amount of said water retained in the material.

2. The process described in claim 1, wherein the amount of solvent added in the pretreatment step is 15–25 percent by weight calculated on the amount of water retained in the material.

3. The process as claimed in claim 1, wherein the solvent used is isopropanol or sec-butanol.

4. The process described in claim 1, wherein the same solvent is added to the dewatered material prior to said storage as is used in the subsequent extraction process.

5. The process as described in claim 3, wherein the same solvent is added to said dewatered material prior to said storage as is used in said subsequent extraction process.

* * * * *

PO-1050
(5/69)

UNITED STATES PATENT OFFICE
CERTIFICATE OF CORRECTION

Patent No. __3,852,260__   Dated __December 3, 1974__

Inventor(s) __Tryggve Lund Knutsen et al.__

It is certified that error appears in the above-identified patent and that said Letters Patent are hereby corrected as shown below:

In the address of the inventors delete "Motellyägen" and substitute -- Åsa Station --;

Delete "Havrekornsgatan" and substitute -- Mölndal --;

Col. 1, line 41 an end parenthesis is missing after "A"".

Col. 4, line 4, insert dots indicating free radicals preceding the "OH" and following the $R^1$, last occurrence, and Col. 4, line 5, following the "O" insert a dot indicating a free radical, as follows:

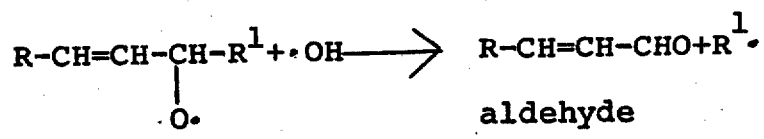

aldehyde

Signed and sealed this 1st day of April 1975.

(SEAL)
Attest:

RUTH C. MASON
Attesting Officer

C. MARSHALL DANN
Commissioner of Patents
and Trademarks